United States Patent [19]

Fedder et al.

[11] Patent Number: 4,641,152
[45] Date of Patent: Feb. 3, 1987

[54] FIXTURING APPARATUS FOR VIBRATION DAMPENED OPTICAL DISC RECORDING

[75] Inventors: Stephen C. Fedder, Oak Park; Anthony J. Skudrna, Harsens Island, both of Mich.

[73] Assignee: Producers Color Service, Inc., Southfield, Mich.

[21] Appl. No.: 831,828

[22] Filed: Feb. 24, 1986

[51] Int. Cl.⁴ .................. G01D 15/34; G11B 7/24
[52] U.S. Cl. .................... 346/137; 369/285; 369/287
[58] Field of Search ................ 346/137; 369/280, 287

[56] References Cited

U.S. PATENT DOCUMENTS 4,510,508 4/1985 Janssen .................. 346/135.1 X

Primary Examiner—E. A. Goldberg
Assistant Examiner—Gerold E. Preston

Attorney, Agent, or Firm—Barnes, Kisselle, Raisch, Choate, Whittemore & Hulbert

[57] ABSTRACT

Apparatus for fixturing an optical recording disc in a DRAW recording machine comprising a hub having a conical shoulder for receiving and locating the disc center opening, and an axially facing shoulder for nesting support of the recording disc. A retaining ring encircles the disc periphery and has an inwardly oriented lip for capturing the disc periphery. A resilient snubber of elastomeric construction extends from the hub to the ring and has a roughened axially facing surface spaced from the opposing surface of the disc. A knob, including a torque-isolating thrust bearing, clamps the hub to the drive spindle of a recording apparatus. In operation, the snubber and air space between the snubber and disc cooperate to dampen vibration of the recording disc for enhanced accuracy and reliability of the recording process.

12 Claims, 5 Drawing Figures

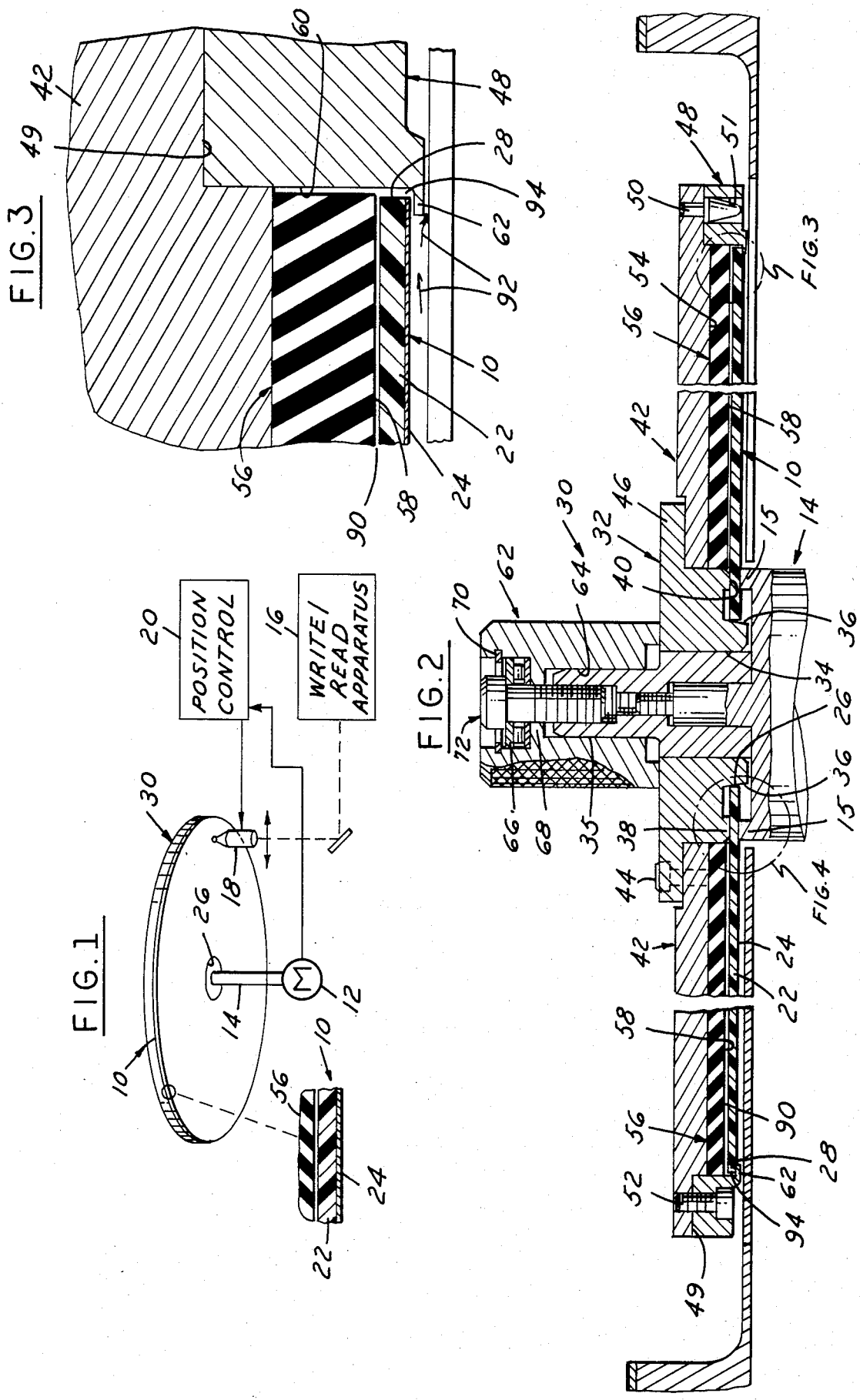

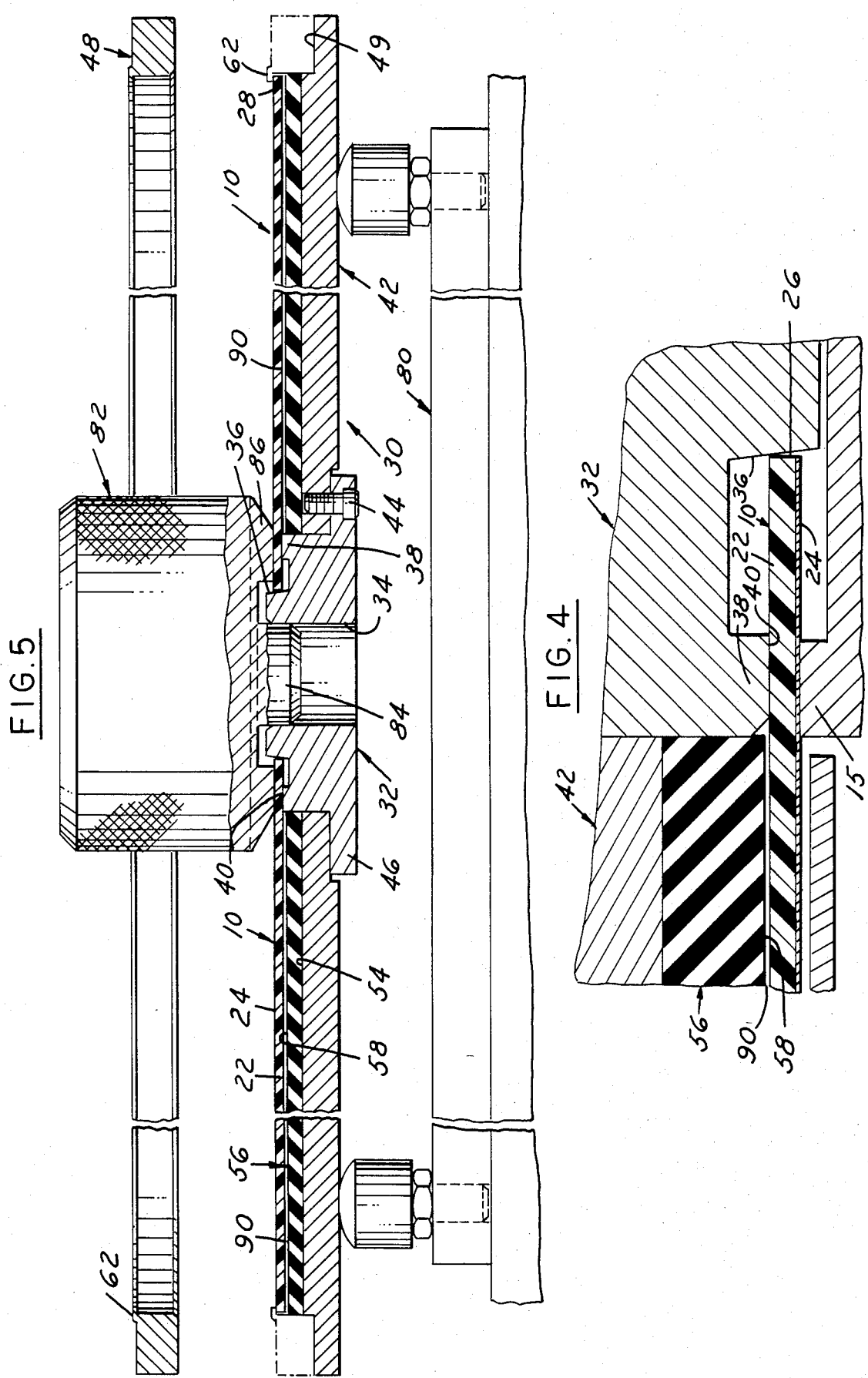

FIXTURING APPARATUS FOR VIBRATION DAMPENED OPTICAL DISC RECORDING

The present invention relates to optical recording of information on preformed discs, and more particularly to a device for fixturing a preformed optical disc in the recording apparatus.

Devices for optically recording information on preformed discs are conventionally termed direct read-after-write or DRAW machines in the art. The recording disc includes a transparent substrate and one or more layers of metallic and/or photoresist film deposited on an axially facing flat surface of the substrate. Where the disc is intended as a recording master, it is conventional practice to employ a relatively thick glass substrate for enhanced durability and rigidity, and to optically record or "burn" information directly onto the recording film without transmission through the substrate—i.e. so-called "first surface" recording. However, where the recording disc is to serve as the final product, it is uneconomical to employ the thick glass substrates used in a mastering operation, leading to problems in dimensional stability of the disc during the recording operation.

U.S. Pat. Nos. 4,074,282, 4,264,911 and 4,353,767 disclose DRAW discs and recording techniques wherein the discs comprise a pair of sandwiched substrates having a recording film disposed on one or both of the opposing substrate surfaces and an air gap or space between the recording films. Information to be recorded is transmitted through one of the substrates and focused onto the associated recording film deposited thereon. Such "second surface" recording techniques are inherently less reliable than first-surface recording because of dependency upon transparency of the substrate. Furthermore, material burned from the film during the recording process remains in particulate form or "dust" between the substrates, thereby adding an element of noise and inaccuracy when recorded information is to be read from the disc. U.S. Pat. No. 4,038,663 proposes to overcome some of the noted problems by mounting a single preformed disc such that the information light beam is incident on the recording surface without passing through the transparent substrate. However, in order to remove vaporized film material and protect information recorded thereon, a transparent foil is spaced from the recording film and a stream of air is directed therebetween for removing vaporized film material. Thus, the information beam is transmitted through the protective foil, so that the disclosed recording technique is not a true first surface recording operation. Following the recording process, the protective foil is sealed against the film and substrate.

It is desirable for reasons of economy to employ plastic, such as PMMA, in manufacture of DRAW discs—i.e. discs constructed for subsequent recording of information in a DRAW process or similar operation. However, such plastic materials do not possess structural stability during high-speed recording at 1800 rpm, for example. Indeed, plate vibratory motions in the plastic substrate during rotation can lead to overlap of recording tracks and consequent obscurity or loss of information recorded therein. Above-noted U.S. Pat. Nos. 4,264,911 and 4,353,767 obtain some degree of dimensional stability in plastic-substrate DRAW discs through the sandwiched substrate construction. However, there still exists the problems of second-surface recording and captured dust noted above.

It is therefore an object of the present invention to provide apparatus for fixturing a preformed disc in a DRAW recording operation which permits first-surface recording and thereby overcomes the aforementioned problems associated with second-surface recording in the art, and/or which is particularly constructed and adapted for maintaining dimensional stability of and damping vibration in DRAW discs embodying thin plastic substrates, and thereby obtaining improved overall economy.

The invention, together with additional objects, features and advantages thereof, will be best understood from the following description, the appended claims and the accompanying drawings in which:

FIG. 1 is a schematic diagram of a DRAW apparatus for recording information on an optical disc;

FIG. 2 is a sectional diagram of a DRAW disc fixturing apparatus in accordance with a preferred embodiment of the present invention;

FIGS. 3 and 4 are fragmentary sectional views on enlarged scales of portions of FIG. 2 respectively encircled and identified; and FIG. 5 is a fragmentary elevational view which illustrates assembly of a DRAW disc to the fixturing apparatus of FIGS. 2–4.

FIG. 1 is a schematic diagram of a DRAW recording operation and illustrates a preformed DRAW disc 10 coupled by a fixture 30 to a spindle 14 and a motor 12 for rotation at controlled angular velocity about the aligned central axes of disc 10 and spindle 14. A read-write apparatus 16, which includes suitable optics and electronics, directs an information-carrying light beam through an objective lens 18 onto the recording surface of disc 10. Objective lens 18 is mounted on a suitable slide or the like (not shown) and coupled to control electronics 20 for motion radially of disc 10 as a function of angular velocity of motor 12 so as to record information in spiral tracks at controlled spacing. Recording disc 10 comprises a preformed composite assembly which includes a flat transparent substrate 22 having a film 24 of metal and/or photoresist recording material deposited thereon. Substrate 22 has a center opening 26 and a periphery 28 at predetermined and relatively closely controlled dimension, with center opening 26 forming the mounting opening of disc 10. Disc substrate 22 and film 24 are of generally uniform and controlled thickness throughout. Although it is currently preferred for reasons of economy to employ fixturing apparatus 30 of the invention in conjunction with DRAW discs having a substrate 22 of plastic construction, such as PMMA, as shown in the drawings, it will be apparent as the description unfolds that the fixturing apparatus of the invention may also be employed in conjunction with glass substrates of controlled dimensions.

FIGS. 2–4 illustrate fixturing apparatus 30 in accordance with a presently preferred embodiment of the invention as comprising a hub 32 having a central opening or passage 34 constructed for telescopic reception over the internally threaded adapter 35 mounted on drive spindle 14. An annular shoulder 35 surrounds opening 34 and has an outwardly facing conical surface 36 which tapers narrowingly away from the body of hub 32 coaxially with the axis of center opening 34. A second annular shoulder 38 surrounds and is radially spaced from hub surface 36, and forms an axially downwardly facing surface 40 (in the orientation of FIGS. 2-4) in a plane which intersects conical surface 36 perpendicularly of its axis. That portion of hub 32 between shoulder 38 and surface 36 is recessed with respect to the plane of shoulder surface 40.

A centrally apertured plate 42 is mounted by a circumferential array of screws 44 to a flange 46 which projects radially from hub 32. An annular retaining ring 48 is seated in a stepped recess 49 at the periphery of plate 42 and is circumferentially located with respect thereto by the tapered guide pins 50 (FIG. 2) which project from plate 42 into corresponding openings 51 in ring 48. Ring 48 is removably affixed to plate 42 by a circumferential array of screws 52. An annular snubber disc 56 of resilient elastomeric construction is affixed to plate 42 within the depression 54 defined between ring 48 and shoulder 38 on hub 32. Snubber disc 56 possesses a flat surface 58 disposed in a plane which is parallel to but slightly recessed or offset axially from the plane of shoulder surface 40. Most preferably, surface 58 of snubber disc 56 is roughened.

Ring 48 has an inside diameter 60 (FIG. 3) which is slightly greater than the nominal outside diameter of disc periphery 28. Ring ID 60 is also slightly greater than the OD of disc 56 to facilitate assembly of ring 48 onto plate 42. A circumferentially continuous lip 62 integrally projects radially inwardly from ring 48 to a diameter which is less than the nominal outside diameter of disc periphery 28. Lip 62 is spaced from surface 58 by more than the sum of the offset of surface 58 from shoulder surface 40 plus the nominal thickness of disc 10. A knurled knob 62 has a countersunk central passage 64 which is slidably telescopically received over spindle adapter 35. A roller-type thrust bearing 66 is captured by a retaining ring 70 against a shoulder 68 in knob passage 64. A screw 72 has a shank threadably received internally of spindle adapter 35, and a head which seats against the upper race of thrust bearing 66 so as to clamp knob 66 against hub 32 and thereby clamp hub 32 to spindle 14. All parts of fixture 30, with the exception of disc 56, are preferably of rigid metallic construction. Disc 56 is preferably of non-porous rubber composition.

In use, and referring to FIG. 5, fixturing apparatus 30 with ring 48 removed is first placed upside down on a temporary support 80. A preformed DRAW disc 10 is positioned with its central opening aligned with and at least partially telescopically received over conical surface 36 of hub 32, and with recording film 24 facing upwardly. The minimum diameter of surface 36 is preferably less than the minimum nominal ID of disc opening 26, while the diameter of surface 36 at the plane of surface 40 is such that disc 10 will be held thereon by slight friction fit. A set-up clamp 82 has a central cylindrical boss 84 which is manually slidably telescopically fitted into passage 34 of hub 32, and has a planar shoulder 86 spaced from boss 84 to engage and urge the central portion of disc 10 over hub surface 36 into seating engagement against surface 40 of shoulder 38. Thus, conical surface 36 functions automatically to center disc 10 with respect to hub opening 34. Ring 48 is then assembled onto plate 42 so that ring lip 62 overlies the periphery of disc 10 and thereby captures the disc periphery on fixture 30.

Clamp 82 is then removed and fixture 30, with disc 10 captured thereon, is ready for mounting onto spindle 14. That is, the assembly of hub 32, plate 42, ring 48 and disc 10 is inverted so that the recording surface of disc 10 faces downwardly, and hub 32 is telescopically positioned over spindle adapter 36 (FIG. 2) until disc 10 engages an opposing shoulder 15 on spindle 14. Note in FIG. 2 that the radius of hub shoulder 38 is such as to oppose spindle shoulder 15. Knob 62 is then positioned over spindle adapter 36, and screw 72 is threaded into the spindle adapter. Thrust bearing 66 functions during tightening of screw 72 to isolate knob 62, hub 32 and, most importantly, disc 10 from torsional forces applied to the clamping screw. Thus, with screw 72 tightened, the central portion of disc 10 is clamped between opposing flat surfaces on hub shoulder 38 and spindle shoulder 15, and periphery 28 of disc 10 is radially cantilevered from this center clamp.

In operation, spindle 14 is rotated by motor 12 (FIG. 1) and the information-bearing beam is focused onto film 24 of disc 10 in the usual manner. Resilient snubber disc 56 functions to dampen vibrations of recording disc 10 as the assembly is rotated. The air space or gap 90 between disc 10 and the roughened surface 58 of disc 56 is believed to enhance such vibration-dampening function of disc 56. That is, during rotation of fixture 30 and disc 10, surface tension and centrifugal forces initiate a radially outwardly directed flow of air 92 (FIG. 3). The air gap or space 94 (FIG. 3) between the periphery 28 of disc 10 on the one hand, and the ID 60 of ring 48 and the opposing contour of lip 62 on the other, couples air space 90 to the area below disc 10 so that air flow in the direction 92 creates a negative pressure within air space 90. It is believed that this negative pressure enhances the vibration-dampening efficiency of resilient snubber disc 56. Roughening of disc surface 58 further enhances the synergistic cushioning effect of disc 56 and air gap 90 by retarding air flow over surface 58. When disc 10 is at rest, disc periphery 28 will normally "droop" under force of gravity, and ring lip 62 prevents contact of the disc with the objective lens or lens-support fixture during initial acceleration and final deceleration, which might otherwise damage the disc periphery and/or the objective lens.

The invention claimed is:

1. Apparatus for optically recording information on a preformed recording disc having a center opening on a disc axis, a peripheral edge at predetermined radius, substantially uniform predetermined thickness and a recording film on one flat disc surface, said apparatus comprising optical recording means, means for mounting said disc with said film adjacent to said recording means, and means including a drive spindle for rotating said disc about the disc axis while simultaneously controlling position of said recording means relative to the disc axis, characterized in that said mounting means comprises hub means constructed to be coaxially coupled to the drive spindle, means for reception into the center opening of a recording disc for locating said center opening with respect to said disc axis, and a shoulder spaced radially from said reception means for centrally seating the recording disc against the spindle such that the periphery of the disc is radially cantilevered from the spindle, plate means affixed to said hub means and having a flat surface spaced from said shoulder, and resilient elastomeric means affixed to said surface of said plate means and extending radially and circumferentially from said shoulder to adjacent said predetermined radius from said axis, said elastomeric means functioning to damp vibratory motion of the recording disc during rotation thereof by said means including said drive spindle.

2. The apparatus set forth in claim 1 wherein said elastomeric means has a planar surface spaced from said shoulder such that there is an air gap of substantially uniform thickness between said planar surface of said elastomeric means and the opposing surface of a recording disc seated against said shoulder, said air gap cooperating with elastomeric construction of said elastomeric means for dampening said vibratory motion.

3. The apparatus set forth in claim 2 wherein said mounting means further comprises means for removable mounting to said plate means and having a lip projecting radially inwardly for axially capturing the periphery of a recording disc mounted on said hub means.

4. The apparatus set forth in claim 3 wherein said lip is spaced from said planar surface of said elastomeric means by an amount which is greater than the substantially uniform predetermined thickness of a recording disc plus the thickness of said air gap.

5. The apparatus set forth in claim 4 wherein said means for reception into said recording disc center opening comprises a conical locating surface defining an axis of said hub means for automatically centering said disc opening to said axis of said hub means.

6. The apparatus set forth in claim 5 wherein said hub means has a center opening for telescopic reception onto the drive spindle, and wherein said apparatus further comprises set-up means having a center boss for telescopic reception into said center opening of said hub means and a peripheral portion for urging a recording disc against said shoulder of said hub means.

7. The apparatus set forth in claim 5 wherein said hub means has a center opening for telescopic reception onto the drive spindle, and wherein said apparatus further includes means constructed for threaded engagement with the drive spindle for clamping said hub means to the drive spindle, and thrust bearing means for cooperating with said threaded-engagement means to isolate torque applied to said threaded-engagement means from said hub means and from a recording disc mounted on said hub means.

8. The apparatus set forth in claim 1 wherein said means for reception into said recording disc center opening comprises a conical locating surface defining an axis of said hub means for automatically centering said disc opening to said axis of said hub means.

9. The apparatus set forth in claim 8 wherein said hub means has a center opening for telescopic reception onto the drive spindle, and wherein said apparatus further comprises set-up means having a center boss for telescopic reception into said center opening of said hub means and a peripheral portion for urging a recording disc against said shoulder of said hub means.

10. The apparatus set forth in claim 1 wherein said hub means has a center opening for telescopic reception onto the drive spindle, and wherein said apparatus further includes means constructed for threaded engagement with the drive spindle for clamping said hub means to the drive spindle, and thrust bearing means for cooperating with said threaded-engagement means to isolate torque applied to said threaded-engagement means from said hub and from a recording disc mounted on said hub.

11. Apparatus for mounting an optical recording disc to a drive spindle, said apparatus comprising a hub having a conical disc-locating surface defining a hub axis and a planar axially facing shoulder spaced radially from said locating surface for seating engagement with a recording disc received over said locating surface; a plate mounted on said hub and extending radially to a plate periphery; a retaining ring removably mounted at said plate periphery, said ring cooperating with said plate and hub to form an annular channel between said hub shoulder and said ring; and a disc of resilient elastomeric construction positioned in said channel and having a flat axially facing surface remote from said plate and disposed between said shoulder and said plate; said retaining ring having a radially inwardly projecting lip for overlapping and capturing the peripheral edge of a recording disc mounted on said hub and seated against said hub shoulder.

12. The apparatus set forth in claim 11 for mounting a said recording disc of predetermined thickness, wherein said ring lip is spaced axially from said planar surface of said hub shoulder by more than said predetermined thickness.

* * * * *